Patented Dec. 15, 1936

2,063,963

UNITED STATES PATENT OFFICE 2,063,963

REACTION PRODUCTS OF AMINES WITH STRONG POLYBASIC MINERAL ACIDS

Heinrich Ulrich, Paul Koerding, and Joseph Nuesslein, Ludwigshafen-on-the-Rhine, Germany, assignors to I. G. Farbenindustrie Aktiengesellschaft, Frankfort-on-the-Main, Germany No Drawing. Application May 2, 1931, Serial No. 534,689. Renewed November 5, 1934. In Germany May 7, 1930

13 Claims. (Cl. 260—98)

The present invention relates to the production of assistants for the textile and related industries.

We have found that very valuable assistants for the textile and related industries, having good washing, cleansing, dispersing and wetting properties and which are also capable of dissolving water-insoluble compounds such as water-insoluble alcohols, can be obtained by reacting on saturated or unsaturated aliphatic amines, i. e. aliphatic open chain, cycloaliphatic or mixed aliphatic-cycloaliphatic or mixed aliphatic-aromatic amines, which contain at least 4 carbon atoms and at least one hydroxyl group or olefinic double linkage, or both, or substitution products thereof, such as hydroxy-alkyl ethers of the said amines, with a strong, polybasic mineral acid compound, including anhydrides or chlorides of these acids, i. e. with concentrated sulphuric acid, chlorsulphonic acid, oleum, sulphur trioxide, phosphoric acid or phosphorus-oxychloride, thereby converting the said amines into chemical combinations with sulphuric ester, sulphonic acid or acid phosphoric ester groups. Substances which are particularly suitable for the said reactions are for example N-mono-n-butyl-N-hydroxyethylamine, N-β-ethyl-hexyl-N-di-hydroxyethyl amine, N-cyclohexyl-N-hydroxy-isopropyl amine, N-β-naphthyl-N-hydroxy-isopropyl amine, elaedine amine, N-cetyl-N-mono-hydroxyethyl amine or β-hydroxy-isohexyl amine $(H_2N-CH_2-CH(OH)-CH_2-CH(CH_3)_2)$.

The reaction is carried out for example by introducing the amines into a double or treble quantity of concentrated sulphuric acid or by stirring with chlorsulphonic acid, in which latter case organic inert diluents, such as ethyl ether, ethylene chloride or carbon tetrachloride, are preferably added. Oleum or sulphuric anhydride may also be employed but in this case the reaction mixture should be carefully cooled owing to the strong action of the said sulphonating agents, the initial reaction temperature being usually between 5° and 25° C., the temperature being then raised, if desired, up to say 85° C. If the amines contain one or more double linkages sulphonic acids may be prepared, this reaction being usually carried out with the aid of chlorsulphonic acid. The sulphuric esters obtained are substances with practically neutral reaction and therefore correspond apparently to the general formula

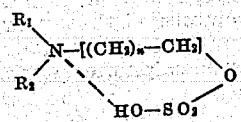

in which $R_1$ denotes an aliphatic, cyclo-aliphatic or aromatic radicle, $R_2$ is the same as $R_1$ or hydrogen and $n$ denotes 1 or an integral number above 1.

The phosphoric esters are usually prepared by introducing the amines at from say 10° to 85° C. into a from about double to treble quantity of concentrated phosphoric acid or into an equimolecular quantity of phosphorus oxychloride, ethylene chloride for example being used as a diluent, if so desired.

The resulting products are especially suitable for washing wool and may be employed in acid, neutral or alkaline baths provided the products contain more than 8 carbon atoms; if amines containing from 4 to 8 carbon atoms have been employed the products are valuable wetting agents for use in mercerizing liquors or other alkaline baths. Alkali metal salts of the said sulphuric or phosphoric esters or sulphonic acids obtainable by inspissating alkaline solutions at a pressure as low as possible may be also employed for the said purposes. The products obtained may also be used in combination with soaps and other wetting and cleansing agents such as Turkey red oils, naphthalenesulphonic acids, sulpho-oleic acid or sulphopalmitic acid. They are in particular insensitive to hard water and prevent the precipitation of calcium soaps.

The following examples will further illustrate the nature of this invention, but the invention is not restricted to these examples. The parts are by weight.

Example 1

100 parts of N-β-ethyl-hexyl-N-mono-ethanol-amine are stirred with, or introduced into, 200 parts of concentrated sulphuric acid at about 30° C. for 2 hours. The reaction mixture is stirred with 1200 parts of a mixture of ice and water, whereby the sulphuric ester of the amine

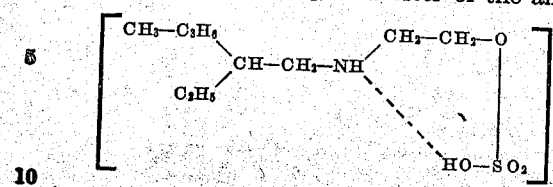

is precipitated in a solid form. After filtration it may be purified by crystallization from hot water; it then forms a neutral white powder, readily soluble in caustic alkali. The product thus obtained has excellent properties as a wetting agent in mercerizing baths.

Instead of ethyl hexyl ethanolamine equivalent amounts of N-cyclohexyl-N-diethanolamine, N-hydroxyethyl-N-tetrahydronaphthylamine or N-cetyl N-ethanolamine may be employed.

Example 2

100 parts of N-n-butyl-N-mono-hydroxyethyl-amine are dissolved in 100 parts of ethylene chloride. The solution obtained is poured at about 20° C. into 200 parts of a mixture of equal parts of chlorosulphonic acid and ethylene chloride and stirred during 2 to 4 hours at from 20° to 30° C. The reaction mixture is then poured into 150 parts of a mixture of ice and water. The aqueous solution of the sulphuric ester obtained

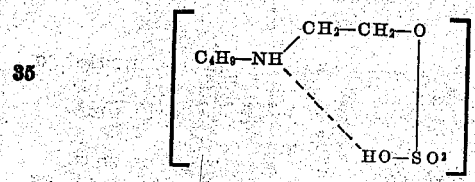

is separated from the layer of ethylene chloride and neutralized with caustic soda solution while cooling to about 20° C. whereby some common salt and Glauber's salt are precipitated. After filtration the solution of the sodium salt may be employed for increasing the wetting power of mercerizing liquors.

Example 3

157 parts of N-cyclohexyl-N-hydroxyisopropyl amine are introduced at a temperature of 30° C. into 214 parts of phosphoric acid of 90 per cent strength. The mixture is heated to 50° C. for two hours and then poured on 300 parts of ice. The resulting solution of the phosphoric ester

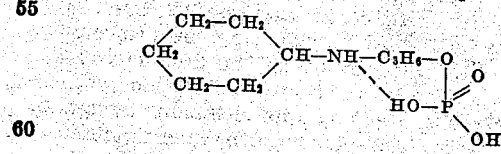

is neutralized with caustic soda and may be employed for scouring purposes. Instead of the amine stated, an equimolecular quantity of N-n-butyl-N-hydroxy-butyl amine or of N-hydroxyethyl-N-lauryl amine may be employed.

Example 4

217 parts of the mono-hydroxyethyl ether of N-di-n-butyl-N-hydroxyethyl amine are dissolved in 500 parts of carbon tetrachloride; gaseous sulphuric anhydride is led into the solution cooled at 20° C. until 80 parts thereof are absorbed. 300 parts of ice are then introduced into the mixture; the carbon tetrachloride separates and is removed, whilst the aqueous solution is neutralized with caustic alkali. The product corresponds to the formula

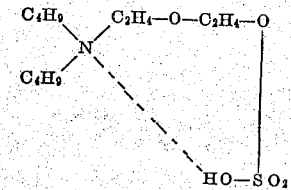

Example 5

12 parts of chlorsulphonic acid are poured at about 10° C. into 40 parts of dry diethyl ether. 27 parts of elaedine amine are then introduced at about 20° C.; the mixture is stirred for about 4 hours while allowing the temperature to rise up to about 35° C. The ether is distilled off and 30 parts of ice are introduced into the remaining product, which is then neutralized with caustic soda solution. The sulphonated product obtained

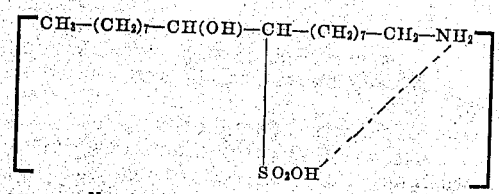

is an excellent washing agent.

Example 6

100 parts of N-n-butyl-N-hydroxy-isopropyl amine are introduced at from 20° to 30°C. into 200 parts of concentrated sulphuric acid. The reaction product is then poured onto 300 parts of ice and is rendered neutral with the aid of caustic soda while cooling. Sodium sulphate separating out is filtered off by suction and an aqueous solution of the sulphuric ester of the amine

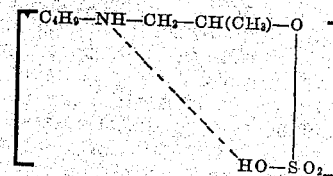

is obtained which is practically free from sodium sulphate.

What we claim is:—

1. Sulphuric esters of secondary amines which are free from acyl and urethane groups and contain an alkylol radical and an aliphatic hydrocarbon radical containing at least 3 carbon atoms.

2. Sulphuric esters of secondary amines which are free from acyl and urethane groups and contain an ethanol radical and an aliphatic hydrocarbon radical containing at least 3 carbon atoms.

3. Sulphuric esters of secondary amines which are free from acyl and urethane groups and contain an ethanol radical and an aliphatic hydrocarbon radical containing from 3 to 4 carbon atoms.

4. As assistants for the textile and related industries, phosphoric esters of aliphatic amines selected from the group consisting of primary, secondary and tertiary amines containing at least 4 carbon atoms and at least one of the groups selected from the class consisting of hydroxyl groups and aliphatic groups with olefinic double linkages, which amines are free from acyl and urethane groups and in which amines any organic radical attached to the nitrogen atom of said amines is an aliphatic group.

5. As assistants for the textile and related industries, phosphoric esters of alkylol amines selected from the group consisting of primary, secondary and tertiary amines containing at least 4 carbon atoms, which amines are free from acyl and urethane groups and in which amines any organic radical attached to the nitrogen atom of said amines is an aliphatic group.

6. Phosphoric esters of secondary amines which are free from acyl and urethane groups and contain an alkylol radical and an aliphatic hydrocarbon radical containing at least 3 carbon atoms.

7. The chemical combination of an amine which is free from acyl and urethane groups, contains at least 4 carbon atoms and has attached to the nitrogen atom thereof an aliphatic group containing at least one of the groups selected from the class consisting of hydroxyl groups and olefinic linkages with a strong polybasic mineral acid.

8. As assistants for the textile and related industries chemical combinations of a strong polybasic mineral acid compound with an amine corresponding to the formula

wherein X stands for an aliphatic radical, Y and Z for hydrogen or an aliphatic radical, at least one of said aliphatic radicals containing at least one of the groupings selected from the class consisting of —OH and —CH=CH—, the said amines being free from acyl and urethane groups and containing in the molecule at least 4 carbon atoms and, if Y and Z are hydrogen, not more than 6 carbon atoms.

9. As assistants for the textile and related industries chemical combinations of a strong polybasic mineral acid with an amine corresponding to the formula

wherein X stands for an aliphatic radical, Y and Z for hydrogen or an aliphatic or aromatic radical, at least one of said aliphatic radicals containing at least one of the groupings selected from the class consisting of —OH and —CH=CH— the said amines being free from acyl and urethane groups and containing in the molecule at least 4 carbon atoms and, if Y and Z are hydrogen, not more than 6 carbon atoms.

10. As assistants for the textile and related industries sulphonation products of an amine corresponding to the formula

wherein X stands for an aliphatic radical, Y and Z for hydrogen or an aliphatic radical, at least one of said aliphatic radicals containing at least one of the groupings selected from the class consisting of —OH and —CH=CH—, the said amines being free from acyl and urethane groups and containing in the molecule at least 4 carbon atoms and, if Y and Z are hydrogen, not more than 6 carbon atoms.

11. As assistants for the textile and related industries sulphonation products of an amine corresponding to the formula

wherein X stands for an aliphatic radical, Y and Z for hydrogen or an aliphatic or aromatic radical, at least one of said aliphatic radicals containing at least one of the groupings selected from the class consisting of —OH and —CH=CH— the said amines being free from acyl and urethane groups and containing in the molecule at least 4 carbon atoms and, if Y and Z are hydrogen, not more than 6 carbon atoms.

12. As assistants for the textile and related industries sulphuric esters of an amine corresponding to the general formula

wherein X is an alkylol group, Y and Z stand for hydrogen or an aliphatic radical, the said amines being free from acyl and urethane groups and containing at least 4 carbon atoms and, if Y and Z are hydrogen, not more than 6 carbon atoms.

13. As assistants for the textile and related industries sulphuric esters of an amine which is free from acyl and urethane groups and which corresponds to the general formula

wherein X is an alkylol group, Y is an aliphatic hydrocarbon radical, Z is a hydrogen or an aliphatic radical, the sum of the carbon atoms in the said amine being at least 4.

HEINRICH ULRICH.
PAUL KOERDING.
JOSEPH NUESSLEIN.